E. H. SEIBERT.
INSECT EXTERMINATOR.
APPLICATION FILED FEB. 17, 1917.

1,259,911.

Patented Mar. 19, 1918.

Witnesses
J. R. Tomlin
R. L. Parker

E. H. Seibert,
Inventor by C. A. Snow & Co.
Attorneys

UNITED STATES PATENT OFFICE.

ELMORE H. SEIBERT, OF NEW YORK, N. Y.

INSECT-EXTERMINATOR.

1,259,911.  Specification of Letters Patent.  Patented Mar. 19, 1918.

Application filed February 17, 1917. Serial No. 149,282.

*To all whom it may concern:*

Be it known that I, ELMORE H. SEIBERT, a citizen of the United States, residing at New York, in the county of New York and State of New York, have invented a new and useful Insect-Exterminator, of which the following is a specification.

This invention relates to insect exterminators particularly designed for use in exterminating roaches.

One of the objects of the invention is to provide a simple, inexpensive, but efficient device of this character which will permit a poisonous substance capable of killing roaches and the like to be placed at convenient points without danger of poisoning children or others who might inadvertently handle the device.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the scope of the invention.

In the accompanying drawings the preferred form of the invention has been shown.

In said drawings:—

Figures 1, 2:
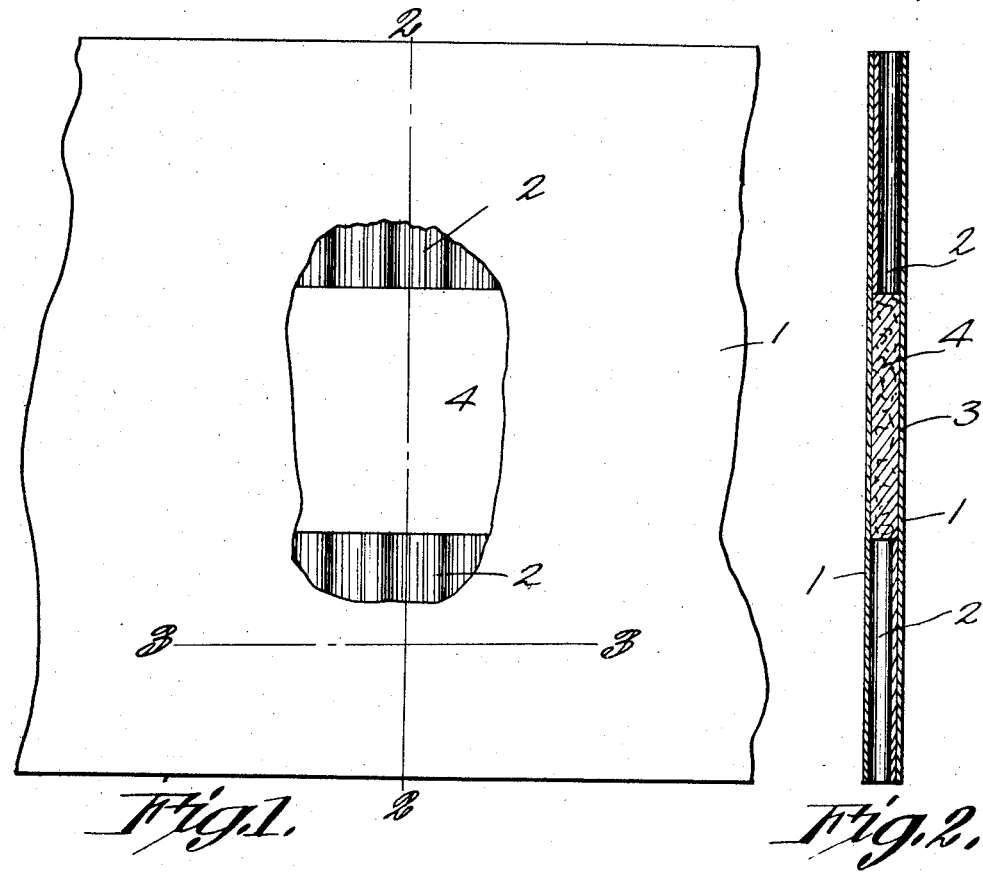
Figure 1 is a plan view of a portion of a device embodying the present improvements, a part of the top of the structure being broken away.
Fig. 2 is a section on line 2—2 Fig. 1.
Figure 3:
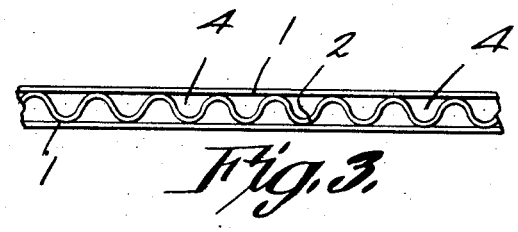
Fig. 3 is a section on line 3—3 Fig. 1.

Referring to the figures by characters of reference 1 designates sheets of waxed paper spaced apart by parallel strips of corrugated waxed paper indicated at 2. The corrugations in the two strips 2 are extended transversely of the strips 1 and toward an intermediate space 3 which is filled with a poisonous substance as indicated at 4. Thus any insects entering the space at any one of the corrugations in the strips 2 will be guided to this poisonous substance which will kill the insect and leave it lodged in the device.

After the device has become filled or partly filled with dead insects, the same can be destroyed by burning. As the poisonous substance is located at the center of the structure, it cannot be reached by persons or animals inadvertently and, consequently, danger of accidental poisoning is avoided.

What is claimed is:—

An insect exterminator including spaced flat strips, spaced corrugated strips interposed between opposed portions of the flat strips and separated at their inner ends, the corrugations leading to the space between said corrugated strips, and a poisonous substance packed in said space and closing the ends of the corrugations.

In testimony that I claim the foregoing as my own, I have hereto affixed my signature in the presence of two witnesses.

ELMORE H. SEIBERT.

Witnesses:
ADA LEBER,
JAS. T. WALSH.

Copies of this patent may be obtained for five cents each, by addressing the "Commissioner of Patents, Washington, D. C."